(12) United States Patent
Makansi et al.

(10) Patent No.: US 8,099,385 B2
(45) Date of Patent: *Jan. 17, 2012

(54) SYSTEM AND ARTICLE OF MANUFACTURE FOR MAINTAINING DATA IN A DISTRIBUTED COMPUTING ENVIRONMENT FOR PROCESSING TRANSACTION REQUESTS

(75) Inventors: Tarek Makansi, Tucson, AZ (US); Gregory Edward McBride, Tucson, AZ (US); David Michael Shackelford, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 511 days.

This patent is subject to a terminal disclaimer.

(21) Appl. No.: 12/253,168

(22) Filed: Oct. 16, 2008

(65) Prior Publication Data

US 2009/0037497 A1    Feb. 5, 2009

Related U.S. Application Data

(63) Continuation of application No. 11/463,866, filed on Aug. 10, 2006, now Pat. No. 7,487,192, which is a continuation of application No. 10/096,423, filed on Mar. 12, 2002, now Pat. No. 7,130,874.

(51) Int. Cl.
*G06F 17/30*    (2006.01)
(52) U.S. Cl. ......... 707/609; 707/634; 707/640; 707/661
(58) Field of Classification Search ..................... None
See application file for complete search history.

(56) References Cited

U.S. PATENT DOCUMENTS

| | | | |
|---|---|---|---|
| 5,185,887 | A | 2/1993 | Takahashi et al. |
| 5,586,310 | A | 12/1996 | Sharman |
| 5,594,900 | A | 1/1997 | Cohn et al. |
| 5,717,989 | A | 2/1998 | Tozzoli et al. |
| 5,721,914 | A | 2/1998 | DeVries |
| 5,742,792 | A | 4/1998 | Yanai et al. |
| 5,995,980 | A | 11/1999 | Olson et al. |
| 6,012,067 | A | 1/2000 | Sarkar |
| 6,026,371 | A | 2/2000 | Beck et al. |
| 6,108,656 | A | 8/2000 | Durst et al. |

(Continued)

FOREIGN PATENT DOCUMENTS

JP    05-128070    5/1993

OTHER PUBLICATIONS

D.R. Crockett, et al., "Local Shadowing of Remote File Directory Information", IBM Corporation, Technical Disclosure Bulletin, vol. 33, No. 5, Oct. 1990, pp. 398-400.

(Continued)

*Primary Examiner* — Hung Q Pham
(74) *Attorney, Agent, or Firm* — David W. Victor; Konrad Raynes & Victor LLP

(57) ABSTRACT

Provided are a system and article of manufacture for maintaining data in a distributed computing environment. Data is stored at a primary storage site. A data structure is processed indicating an association of data sets in the stored data, secondary storage sites, and update frequencies. In response to processing the data structure, a determination is made of one of a plurality of secondary storage sites and a determination is made of at least one data set to transmit to the determined secondary storage site at an update frequency. The determined data set is transmitted to the determined secondary storage site according to the update frequency.

12 Claims, 9 Drawing Sheets

U.S. PATENT DOCUMENTS

| | | | |
|---|---|---|---|
| 6,125,352 | A | 9/2000 | Franklin et al. |
| 6,173,377 | B1 | 1/2001 | Yanai et al. |
| 6,226,650 | B1 | 5/2001 | Mahajan et al. |
| 6,292,800 | B1 | 9/2001 | Eldreth |
| 6,327,622 | B1 | 12/2001 | Jindal et al. |
| 6,363,357 | B1 | 3/2002 | Rosenberg et al. |
| 6,430,577 | B1 | 8/2002 | Hart |
| 6,535,880 | B1 | 3/2003 | Musgrove et al. |
| 6,564,336 | B1 | 5/2003 | Majkowski |
| 6,754,773 | B2 | 6/2004 | Ulrich et al. |
| 6,757,698 | B2 | 6/2004 | McBride et al. |
| 6,944,661 | B2 | 9/2005 | Moore |
| 6,983,277 | B2 | 1/2006 | Yamaguchi et al. |
| 7,130,874 | B2 | 10/2006 | Makansi et al. |
| 2006/0294110 | A1 | 12/2006 | Makansi et al. |
| 2006/0294162 | A1 | 12/2006 | Makansi et al. |

OTHER PUBLICATIONS

A. Hac, "Modeling and Implementation of Concurrency Control", Institution of Electrical Engineers, 2001, abstract.

Restriction Requirement dated Aug. 2, 2004, pp. 1-5, for U.S. Appl. No. 10/096,423, by inventors Tarek Makansi et al.

Response dated Sep. 2, 2004, pp. 1-2, to Restriction Requirement dated Aug. 2, 2004, pp. 1-5, for U.S. Appl. No. 10/096,423, by inventors Tarek Makansi et al.

First Office Action dated Mar. 11, 2005, pp. 1-20, for U.S. Appl. No. 10/096,423, by inventors Tarek Makansi et al.

Response dated Jun. 13, 2005, pp. 1-14, to First Office Action dated Mar. 11, 2005, pp. 1-20, for U.S. Appl. No. 10/096,423, by inventors Tarek Makansi et al.

Final Office Action dated Jul. 27, 2005, pp. 1-13, for U.S. Appl. No. 10/096,423, by inventors Tarek Makansi et al.

Response dated Sep. 27, 2005, pp. 1-11, to Final Office Action dated Jul. 27, 2005, pp. 1-13, for U.S. Appl. No. 10/096,423, by inventors Tarek Makansi et al.

Third Office Action dated Jan. 9, 2006, pp. 1-10, for U.S. Appl. No. 10/096,423, by inventors Tarek Makansi et al.

Response dated Apr. 17, 2006, pp. 1-11, to Third Office Action dated Jan. 9, 2006, pp. 1-10, for U.S. Appl. No. 10/096,423, by inventors Tarek Makansi et al.

Notice of Allowance dated Jul. 6, 2006, pp. 1-13, for U.S. Appl. No. 10/096,423, by inventors Tarek Makansi et al.

First Office Action dated Feb. 1, 2008, pp. 1-12, for U.S. Appl. No. 11/463,866, by inventors Tarek Makansi et al.

Response dated May 2, 2008, pp. 1-9, to First Office Action dated Feb. 1, 2008, pp. 1-12, for U.S. Appl. No. 11/463,866, by inventors Tarek Makansi et al.

Notice of Allowance dated Aug. 11, 2008, pp. 1-9, for U.S. Appl. No. 11/463,866, by inventors Tarek Makansi et al.

First Office Action dated Oct. 4, 2007, pp. 1-13, for U.S. Appl. No. 11/463,865, by inventors Tarek Makansi et al.

Response dated Jan. 4, 2008, pp. 1-15, to First Office Action dated Oct. 4, 2007, pp. 1-13, for U.S. Appl. No. 11/463,865, by inventors Tarek Makansi et al.

Second Office Action dated Jun. 3, 2008, pp. 1-15, for U.S. Appl. No. 11/463,865, by inventors Tarek Makansi et al.

Response dated Oct. 7, 2008, pp. 1-14, to Second Office Action dated Jun. 3, 2008, pp. 1-15, for U.S. Appl. No. 11/463,865, by inventors Tarek Makansi et al.

Final Office Action dated Jan. 9, 2009, pp. 1-16, for U.S. Appl. No. 11/463,865, by inventors Tarek Makansi et al.

Response dated Apr. 10, 2009, pp. 1-11, to Final Office Action dated Jan. 9, 2009, pp. 1-16, for U.S. Appl. No. 11/463,865, by inventors Tarek Makansi et al.

Notice of Allowance dated May 6, 2009, pp. 1-7, for U.S. Appl. No. 11/463,865, by inventors Tarek Makansi et al.

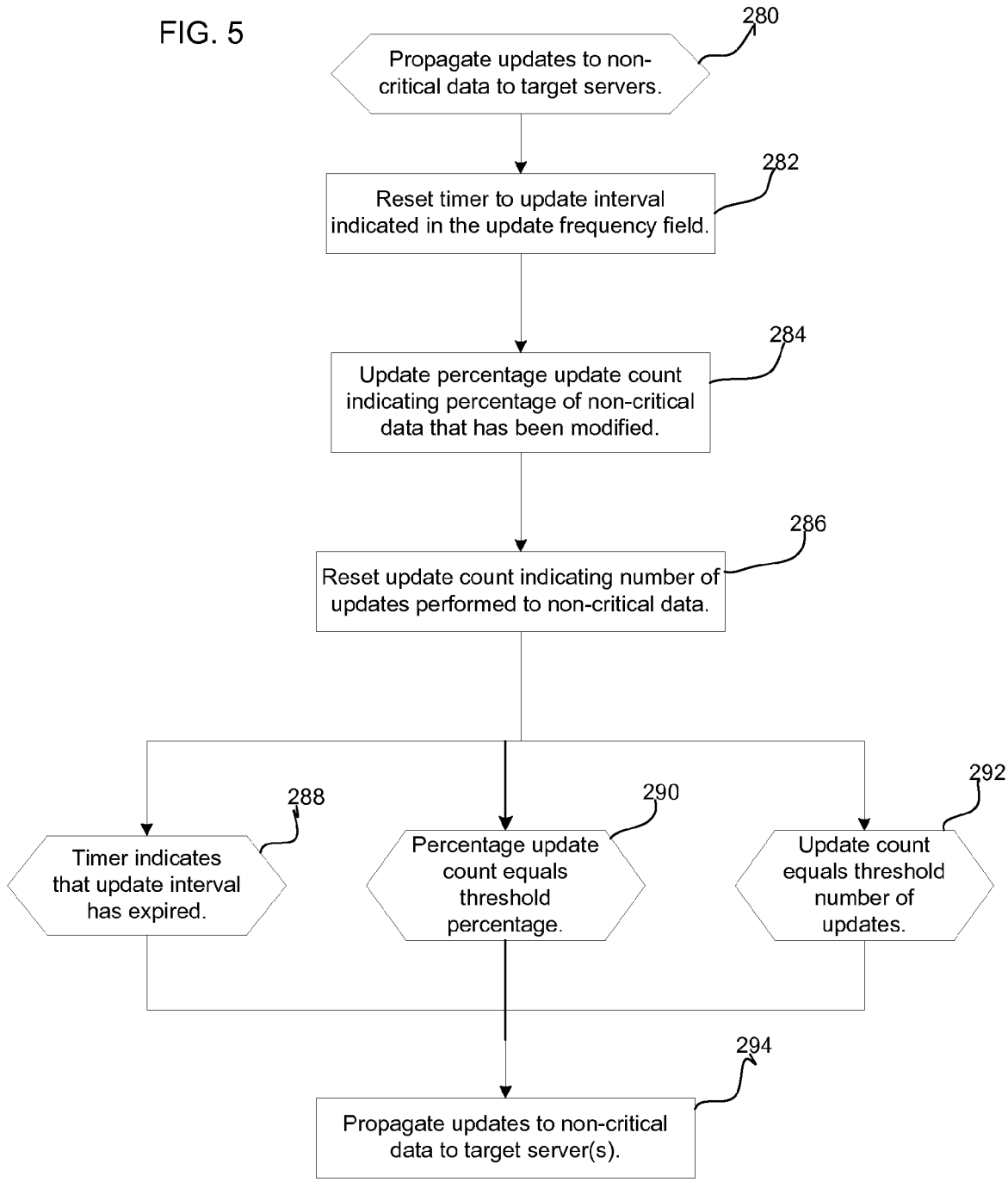

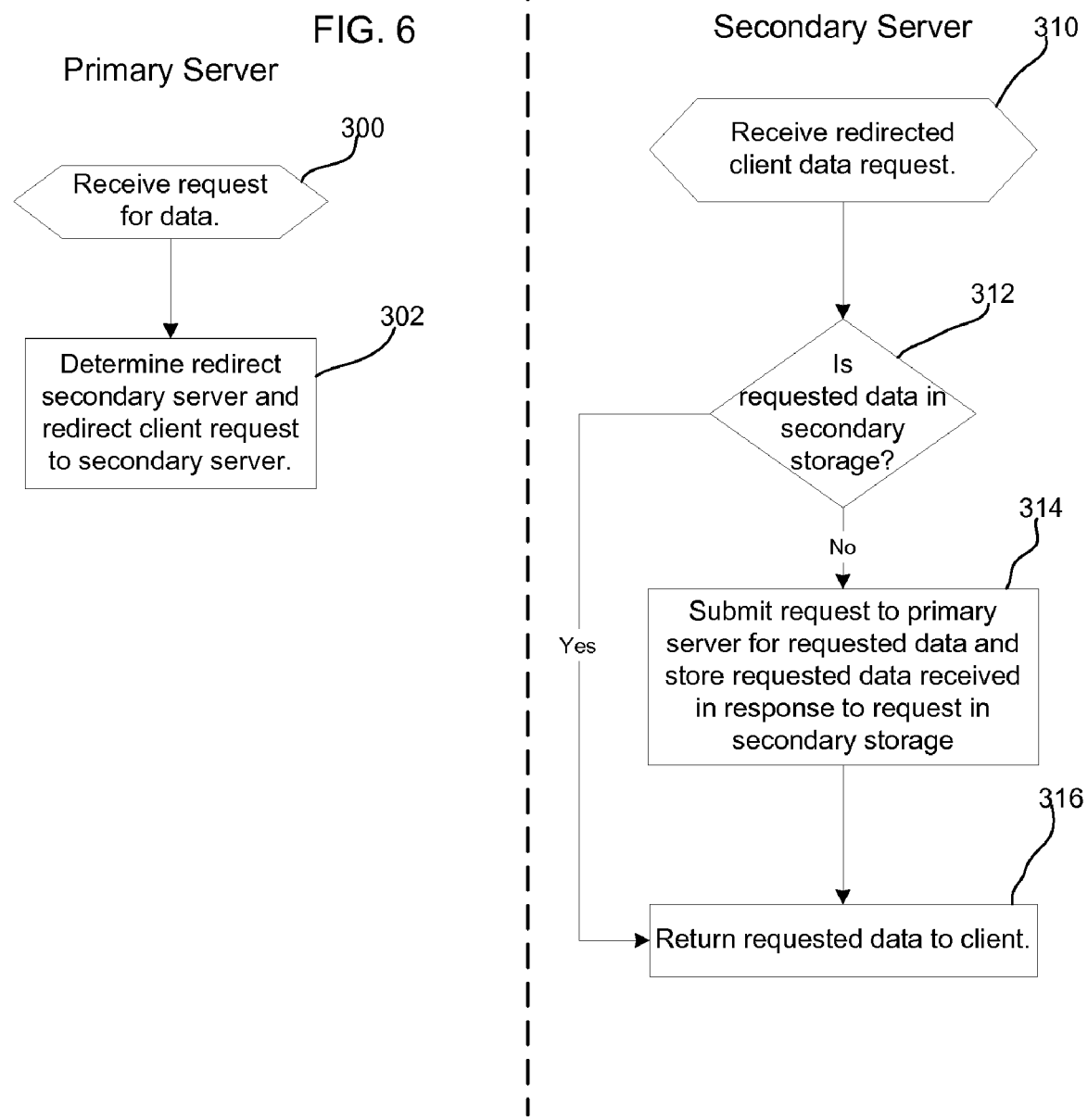

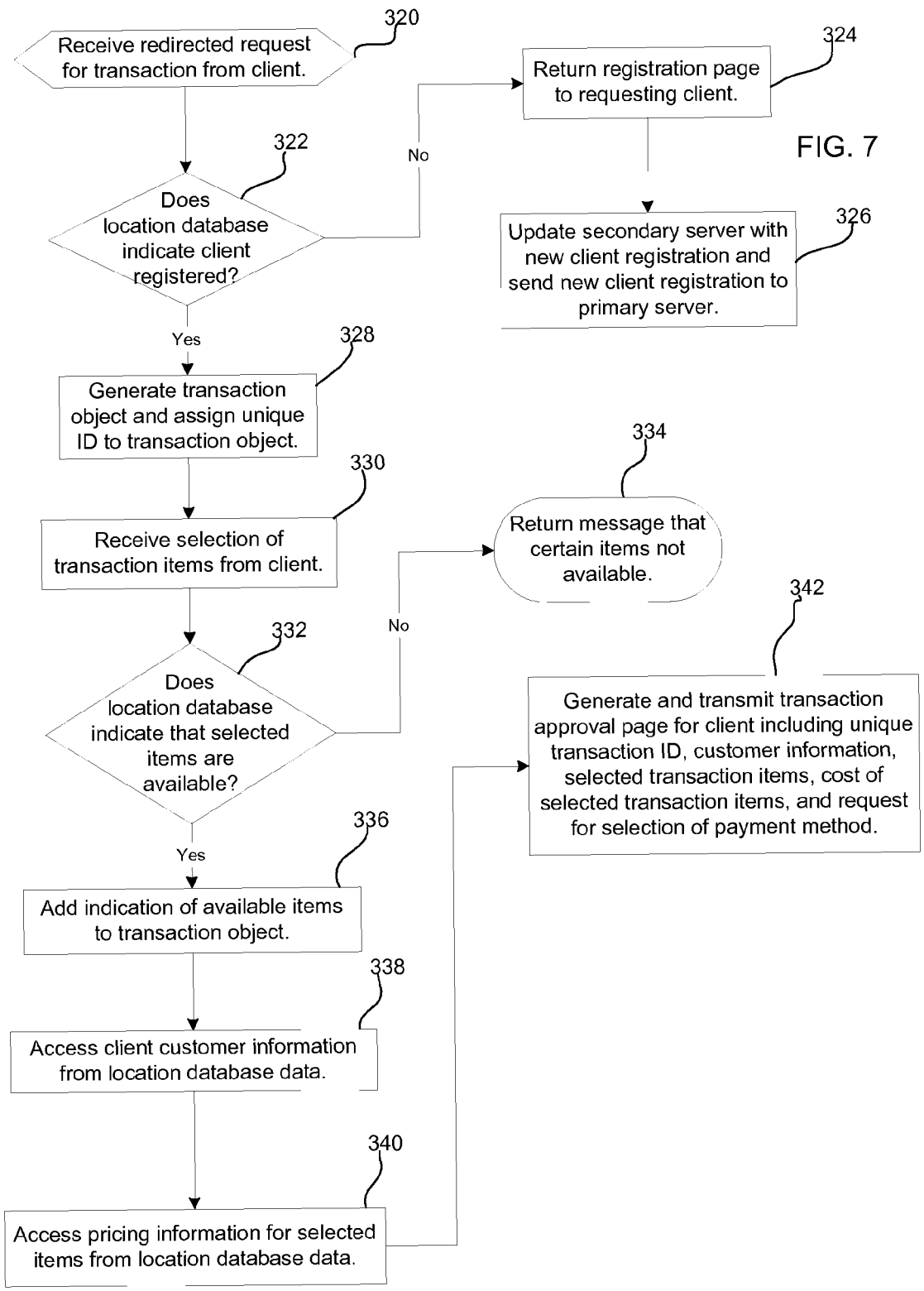

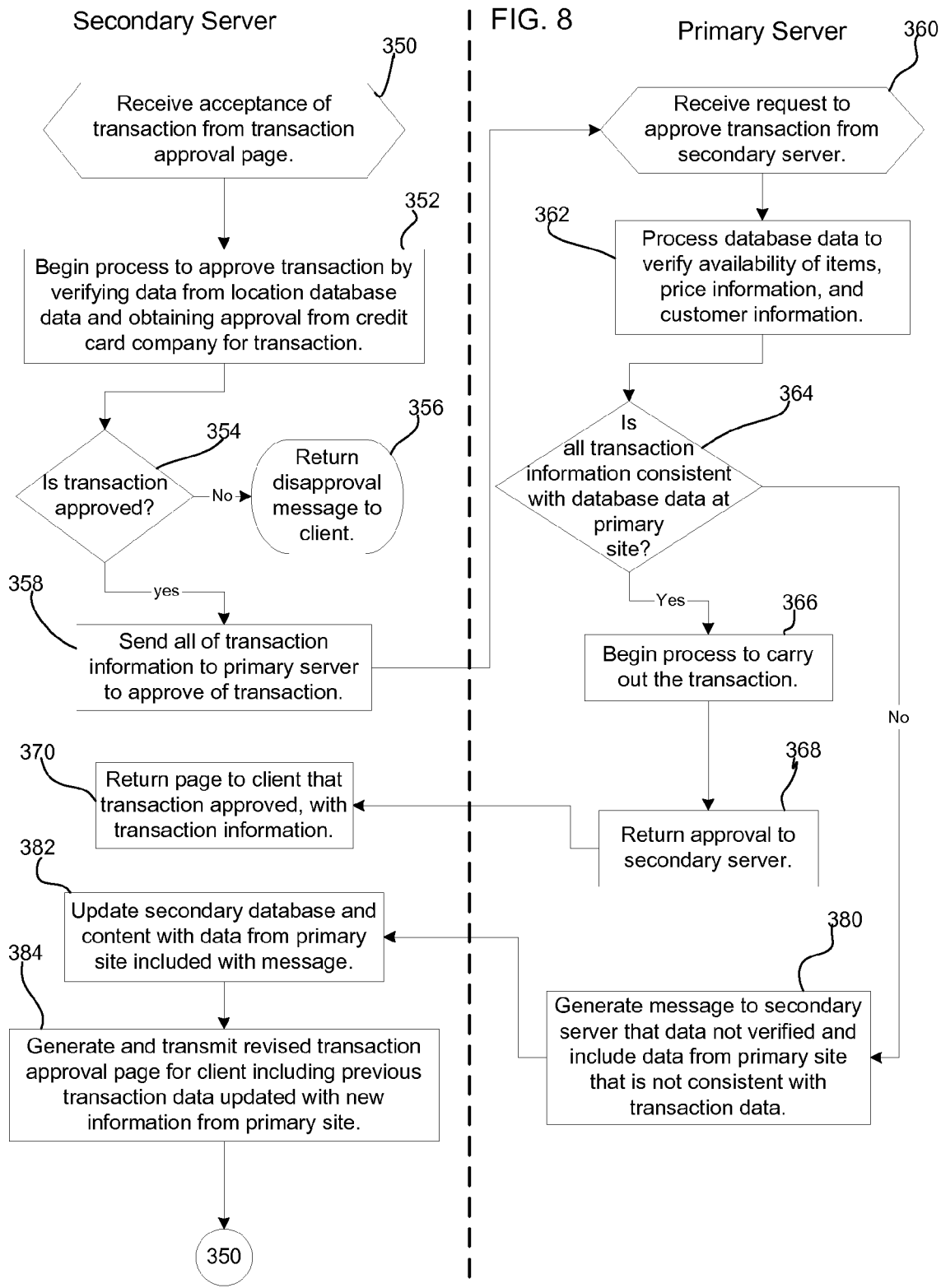

SYSTEM AND ARTICLE OF MANUFACTURE FOR MAINTAINING DATA IN A DISTRIBUTED COMPUTING ENVIRONMENT FOR PROCESSING TRANSACTION REQUESTS

CROSS-REFERENCE TO RELATED APPLICATIONS

This application is a continuation of U.S. patent application Ser. No. 11/463,866, filed on Aug. 10, 2006, which is a continuation of U.S. patent application Ser. No. 10/096,423, filed on Mar. 12, 2002, which patent applications are incorporated herein by reference in their entirety.

BACKGROUND OF THE INVENTION

1. Field of the Invention

The present invention relates to a method, system, and program for maintaining data in a distributed computing environment for processing transaction requests.

2. Description of the Related Art

In a common transaction model for Internet electronic commerce (e-commerce), a consumer retrieves Internet web pages (e.g., Hypertext Markup Language (HTML) pages, Extensible Markup Language (XML) pages, etc.) from a retailer's web site to select a product and then purchase the product online, typically using a credit card number. The consumer will retrieve one page, such as the product search and selection page, and select a product within the page displayed within a graphical user interface (GUI), such as an HTML browser, and then submit the page back to the retailer web site. The retailer web site will then transmit pages to the consumer's browser including fields where the consumer enters billing and credit card information, which is then submitted back to the retailer's web site to process the transaction. The retailer Web site will typically confirm completion of the transaction to the consumer's browser upon determining that there is sufficient inventory to fulfill the purchase and verifying the provided credit card number.

One of the noticeable effects of the above e-commerce transaction model is the transmission or network delays that occur when the data is transmitted back-and-forth between the consumer browser and the retailer web site. Such delays increase as the distance between the retailer web site and consumer also increases. The consumer oftentimes experiences this delay by having to wait for a submitted page including user entered information to be received by the retailer web site and having to wait to receive the next page that is part of the transaction.

For these reasons, there is a need in the art for improved techniques for enabling remote transactions over a network, such as commercial transactions.

SUMMARY OF THE PREFERRED EMBODIMENTS

Provided are a method, system, and program for maintaining data in a distributed computing environment. Data is stored at a primary storage site. A data structure is processed indicating an association of data sets in the stored data, secondary storage sites, and update frequencies. In response to processing the data structure, a determination is made of one of a plurality of secondary storage sites and a determination is made of at least one data set to transmit to the determined secondary storage site at an update frequency. The determined data set is transmitted to the determined secondary storage site according to the update frequency.

In further implementations, the data structure includes entries, wherein each entry indicates at least one data set to be transmitted to at least one secondary site at one update frequency.

Still further, the data sets in the primary storage site transmitted to at least one of the secondary storage sites comprises product information used in an electronic commerce web site. Client requests for product information from the primary storage site are received and the client request for product information is redirected to one of the secondary storage sites. Product information is returned from the secondary storage site to which the client request is redirected to a client originating the client request.

Further provided are a method, system, and program for processing a transaction. Transaction data is transmitted from one primary storage site to a plurality of secondary storage sites. A transaction request is received at one secondary storage site and processed to include transaction data from the secondary storage site that was transmitted from the primary storage site. The processed transaction request including transaction data is transmitted from the secondary storage site to the primary storage site to approve the transaction. The transaction request at the primary storage site is approved if the transaction data included in the received transaction request is consistent with the transaction data maintained at the primary storage site.

In further implementations, the transaction request received at the secondary storage site comprises a request to access resources. A determination is made from the transaction data at the secondary storage site that was transmitted from the primary storage site as to whether the requested resource is available. A message indicating that the requested resource is not available is returned if the transaction data at the secondary storage site indicates that the requested resource is not available.

Yet further, the transaction request received at the secondary storage site comprises a request to purchase a product. Determination is made from the transaction data at the secondary storage site that was transmitted from the primary storage site of pricing information for the requested product. A response to return to a client originating the transaction request indicating the pricing information for the requested product is generated at the secondary storage site. The generated response is transmitted to the client.

The described implementations provide techniques for propagating data from a primary site to secondary storage sites so that transaction requests can be directed to the secondary storage site to handle. With the described implementations, the transaction requests are processed at the secondary storage site with data transmitted from the primary storage site. The processed transaction request is then submitted to the primary site to approve the transaction to ensure that the transaction data at the secondary storage site is consistent with that at the primary storage site. In this way, many of the transaction processing operations are performed at the secondary sites, which may be closer in geographical proximity to the clients initiating the transaction requests.

BRIEF DESCRIPTION OF THE DRAWINGS

Referring now to the drawings in which like reference numbers represents corresponding parts throughout:

FIGS. 4 and 5 illustrate logic to schedule data mirroring operations in accordance with implementations of the invention;

FIG. 6 illustrates logic to process data requests in accordance with implementations of the invention; and FIGS. 7 and 8 illustrate logic to process a transaction request in accordance with implementations of the invention.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Figure 1:
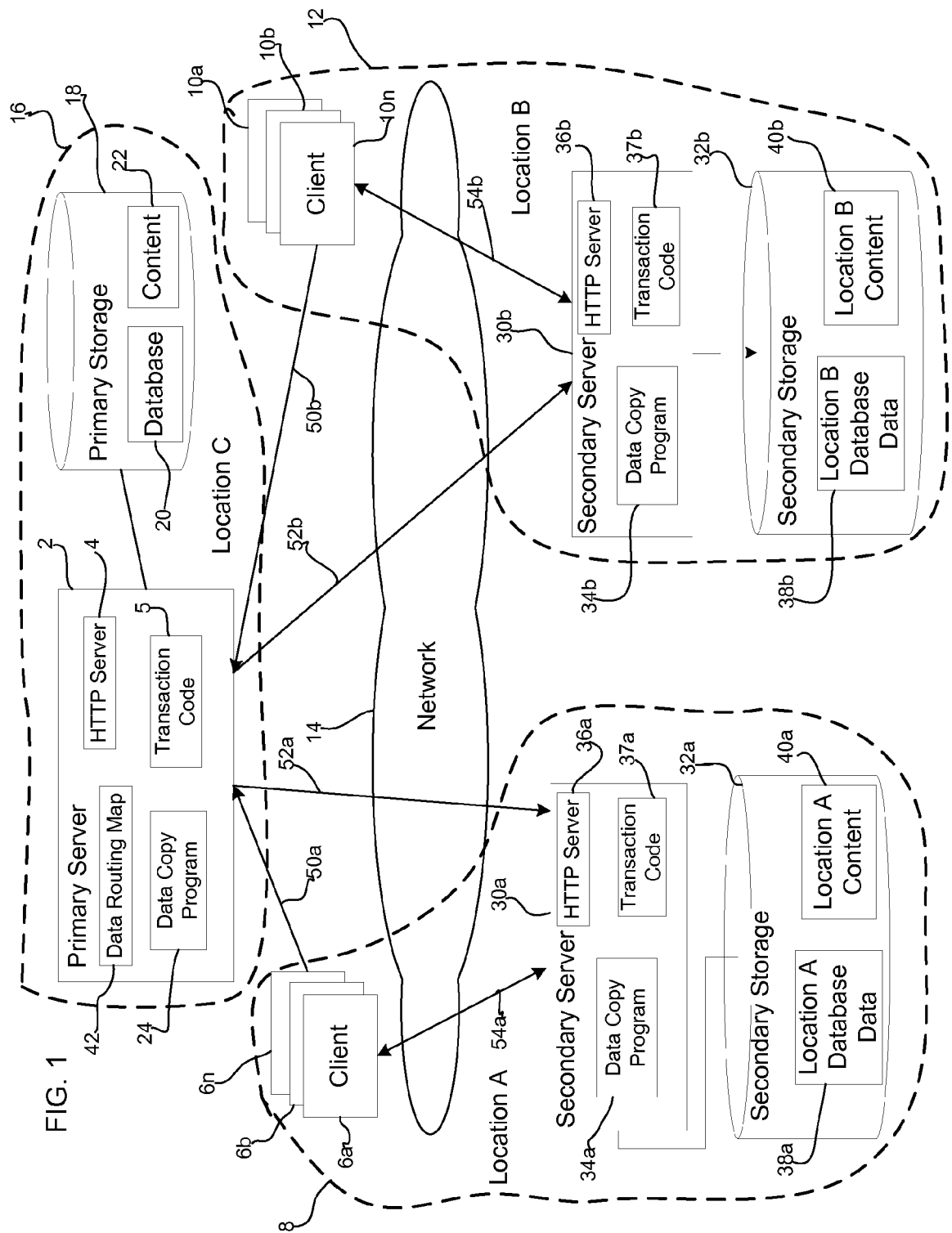
FIG. 1 illustrates a distributed computing environment in which aspects of the invention are implemented.

FIG. 1 illustrates a distributed computing environment in which aspects of the invention are implemented. A primary server 2 maintains a Hypertext Transfer Protocol (HTTP) server 4 to respond to HTTP requests from clients 6a, 6b . . . 6n in geographical location A (8) and clients 10a, 10b . . . 10n in geographical location B (12) over a network 14. The primary server 2 further includes transaction code 5 to process transaction requests as described below. The clients 6a, 6b . . . 6n and 10a, 10b . . . 10n may include HTTP clients, such as Hypertext Markup Language (HTML) browsers (not shown) to transmit HTTP requests for information to the HTTP server 4. The network 14 may comprise any type of network known in the art, such as a Wide Area Network, the Internet, an Intranet, a Local Area Network (LAN), etc. The geographical locations A (8) and B (12) may be separated by a significant geographical distance from geographical location C (16), which includes the primary server 2. For instance, the location C (14) may be separated by a distance of thousands of miles from locations A (8) and B (12), or on separate continents, different states, etc.

The primary server 2 is capable of accessing data from primary storage 18, which includes database data 20, such as database tables, and content 22, such as textual information, multimedia content (e.g., audio files, movie files, images, etc.). The primary server 2 includes a data copy program 24 capable of propagating data from the primary storage 18 to secondary servers 30a and 30b at locations A (8) and B (12) to store in secondary storages 32a and 32b, respectively. The secondary servers 30a and 30b further include data copy programs 34a and 34b, respectively, to receive data from the primary server data copy program 24 and store received data in the secondary storages 32a and 32b. In certain implementations, the data copy program 24, 30a, and 30b may comprise the International Business Machines Corporation (IBM) Extended Remote Copy (XRC) or Peer-to-Peer Remote Copy (PPRC) products that ensure that updates to a primary location are applied to a secondary location in real time. Alternatively, the data copy programs 24a, 30a, and 30b may comprise any program capable of replicating data and data updates at a primary location to mirror sites. Although two secondary sites at locations A (8) and B (12) are shown, additional sites, including additional secondary servers and storages, may be incorporated into the distributed computing environment of the described implementations.

The secondary servers 30a and 30b further include HTTP servers 36a and 36b, respectively, to respond to HTTP requests from the clients 6a, 6b . . . 6n and 10a, 10b . . . 10n. The secondary servers also include transaction code 37a and 37b to process client requests in the manner described below. The secondary storages 32a and 32b include location specific database data 38a and 38b and location specific content 40a and 40b. The location specific data 38a, 38b, 40a, and 40b are subsets of the data 20 and 22 maintained in the primary storage 20 and 22. For instance, the primary storage 18 includes database data 20 and content 22 for all geographical locations. The data routing map 42 provides information on how data in the primary storage database data 20 and content 22 maps to the location sites A (8) and B (12). The data copy program 24 would access the data routing map 42 to determine which secondary server site to send data so that location A specific data is sent to secondary server 30a and location B specific data is sent to secondary server 30b.

In certain implementations, the clients 6a, 6b . . . 6n and 10a, 10b . . . 10n would submit HTTP requests for data in the primary storage 18 to the primary server 2 over network 14. The HTTP server 4 may then redirect requests from the clients 6a, 6b . . . 6n and 10a, 10b . . . 10n to the secondary server 30a and 30b at the location that is the situs of the originating client, i.e., requests from clients 6a, 6b . . . 6n would be redirected to the secondary server 30a at location A (8) and requests from clients 10a, 10b . . . 10n would be redirected to secondary server 30b at location B (12). In certain implementations, because the secondary storages 32a and 32b maintain location specific data, the secondary servers 30a and 30b can service requests from the clients 6a, 6b . . . 6n and 10a, 10b . . . 10n from location specific data.

In certain of the implementations, a portion of the data in the secondary storages 32a and 32b may be common data maintained at all remote locations A and B, and other of the data at the remote sites may be specific to the particular location. For instance, in implementations where the primary server comprises a retailer e-commerce web site, the database 20 may maintain customer account information, such as address and payment information, and inventory information. The content 22 may maintain information on products and services provided by the retailer. The retailer would further maintain the secondary sites at the locations A and B to service client requests from the secondary storages systems within their geographic proximity. In this way, network related delays resulting from the processing of commercial communications between the clients 6a, 6b . . . 6n and 10a, 10b . . . 10n and the server processing the transaction are minimized because the distance of the network transaction is reduced. The content 40a and 40b may include the same data on the retailer products and services, and thus not differ between geographical sites. However, the location specific database data 38a and 38b may include information on only those clients 6a, 6b . . . 6n and 10a, 10b . . . 10n within the geographical location of the secondary server 30a and 30b, such that location A database data 38a would include customer information for clients 6a, 6b . . . 6n, and not clients 10a, 10b . . . 10n, and database data 38b would include customer information for clients 10a, 10b . . . 10n and not clients 6a, 6b . . . 6n.

Figure 2A:
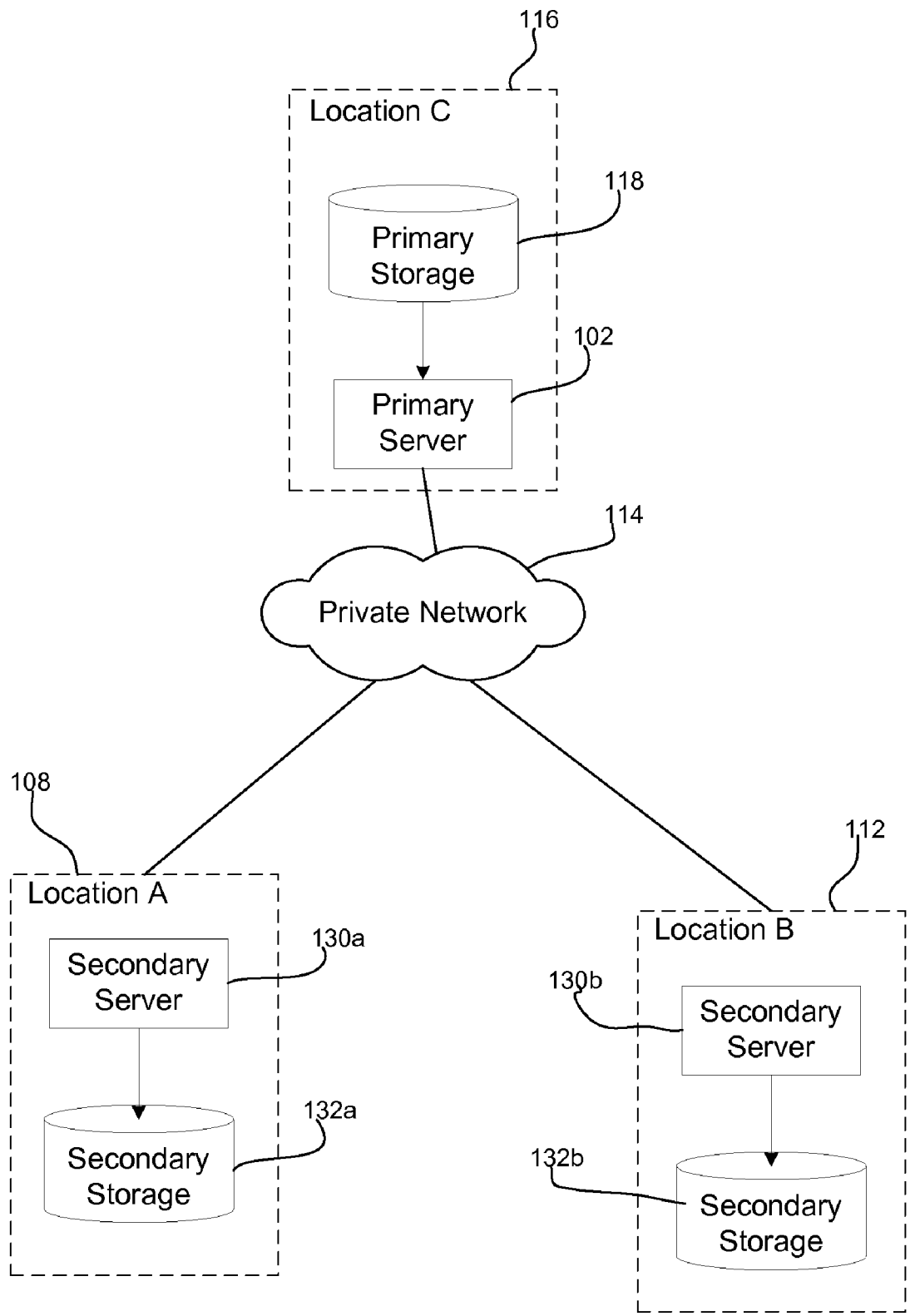
FIGS. 2a and 2b illustrate additional distributed computing environments in which further aspects of the invention are implemented.
Figure 2B:
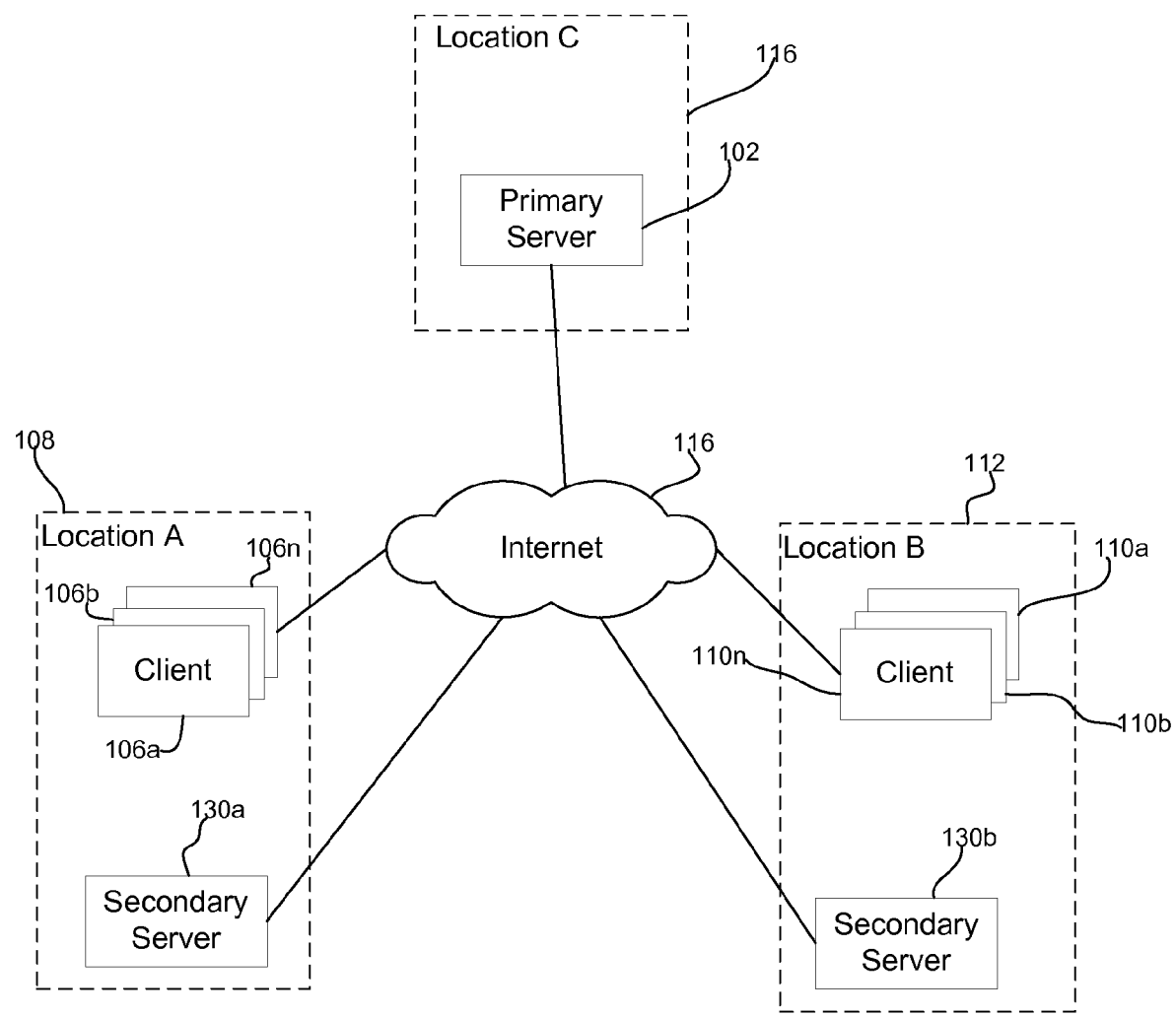

In the implementation shown in FIG. 1, the clients 6a, 6b . . . 6n and 10a, 10b . . . 10n, secondary servers 30a and 30b, and primary server 2 communicate over a common network 14, such as the Internet or any other network known in the art. FIGS. 2a and 2b illustrate an additional implementation where, as shown in FIG. 2a, the primary server 102 and secondary servers 130a and 130b communicate over a private network 114, which may comprise any network limited to authorized members of the organization, i.e., employees etc. The private network 114, may comprise a Wide Area Network (WAN), Storage Area Network (SAN), Intranet, Local Area Network (LAN), Virtual Private Network (VPN), etc. Separately, as shown in FIG. 2b, the clients 106a, 106b ... 106n and 110a, 110b ... 110n, primary server 102, and secondary servers 130a and 130b may communicate over a separate network 116, such as the Internet. In this way, the primary server 102 propagates data to the secondary servers 130a and 130b through a private network separate from the network the clients 106a, 106b ... 106n and 110a, 110b ... 110n use to access the data.

Still further alternative distributed computing environments are possible. For instance, in certain implementations, a separate network may exist between the clients 106a, 106b ... 106n and 110a, 110b ... 110n and the secondary servers 130a and 103b in a particular geographical location, such as a Storage Area Network (SAN), Local Area Network (LAN), etc. Yet further, the clients may communicate with the secondary server within their geographical location through a common subnet of the Internet, such that each geographical location comprises a separate subnet. Any other network architecture or arrangement known in the art may also be used to connect the clients, primary server and secondary servers.

Figure 3:
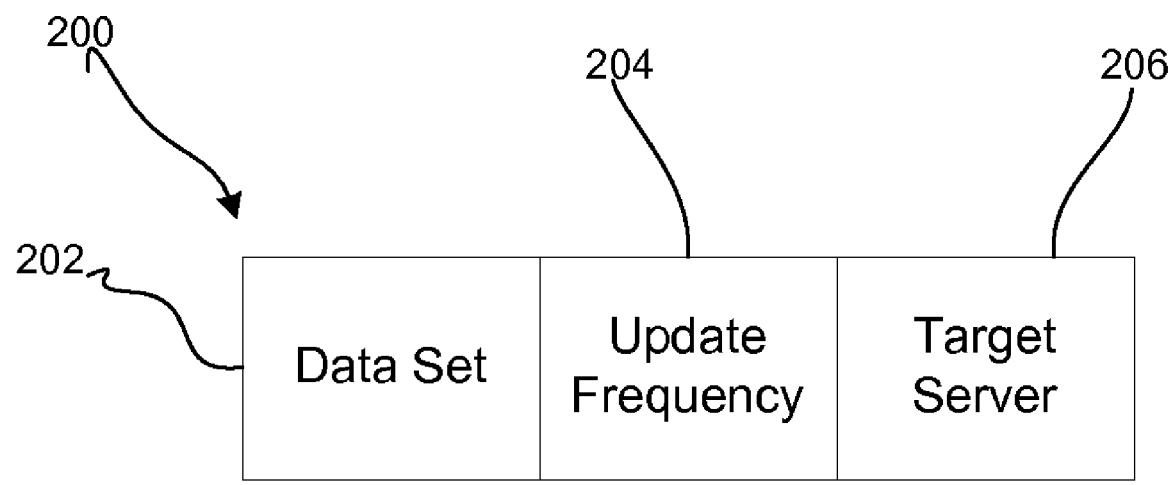
FIG. 3 illustrates a data structure for providing information on how to propagate data sets to secondary servers in accordance with implementations of the invention.

As discussed, when propagating data to the remote secondary servers 30a and 30b, the primary server 2, and data copy program 24 therein may use a data routing map 42, or any other data structure, to determine how to route data to the secondary sites. FIG. 3 illustrates an example in one implementation of the information the data routing map 42 would maintain for each data set to be mirrored at a remote secondary site. The data routing map 42 maintains an entry 200 for each data set to be separately mirrored to one or more of the remote secondary servers 30a and 30b. Each entry 200 includes a data set information 202 indicating the data sets to be mirrored. The data set information 202 may indicate specific files, a directory, a database table, records in a database, etc. In certain instances, the data set information 202 may indicate a query, such that all data in the database data 20 and/or content 22 satisfying the query is part of the data set to mirror. For instance, the query may indicate a particular location, such that all database records having the location value, i.e., all customers within a particular geographic region, form a data set to mirror to a particular server 30a, 30b.

Each entry 200 further indicates an update frequency 204 that specifies how frequently data from a particular data set 202 is mirrored to the remote site. For instance, critical data, such as payment and address information, inventory information, etc., may be immediately mirrored to the remote sites, such that any updates to such critical data are immediately copied to the remote site in real time. In this way, the secondary storages 32a and 32b maintain the most recent updates for such critical data. In certain implementations, the data copy program 24 may transfer updates to critical data immediately to the secondary servers 30a and 30b when such updates are applied to the primary storage 18, such that the update does not complete until the secondary server 30a and 30b acknowledges receiving the update. However, less critical data may be updated at less frequent intervals, such as once a day, etc. For instance, the retailer product advertising and pricing information may be mirrored only once a day as such data does not frequently change. The target server information 206 indicates the one or more secondary servers 30a, 30b to receive the data sets. For instance, data that is common among the geographical locations, such as certain advertising and pricing information, may be propagated to all secondary servers 30a and 30b, whereas geographical specific data may be propagated to the one or more servers within that specific region.

Figure 4:
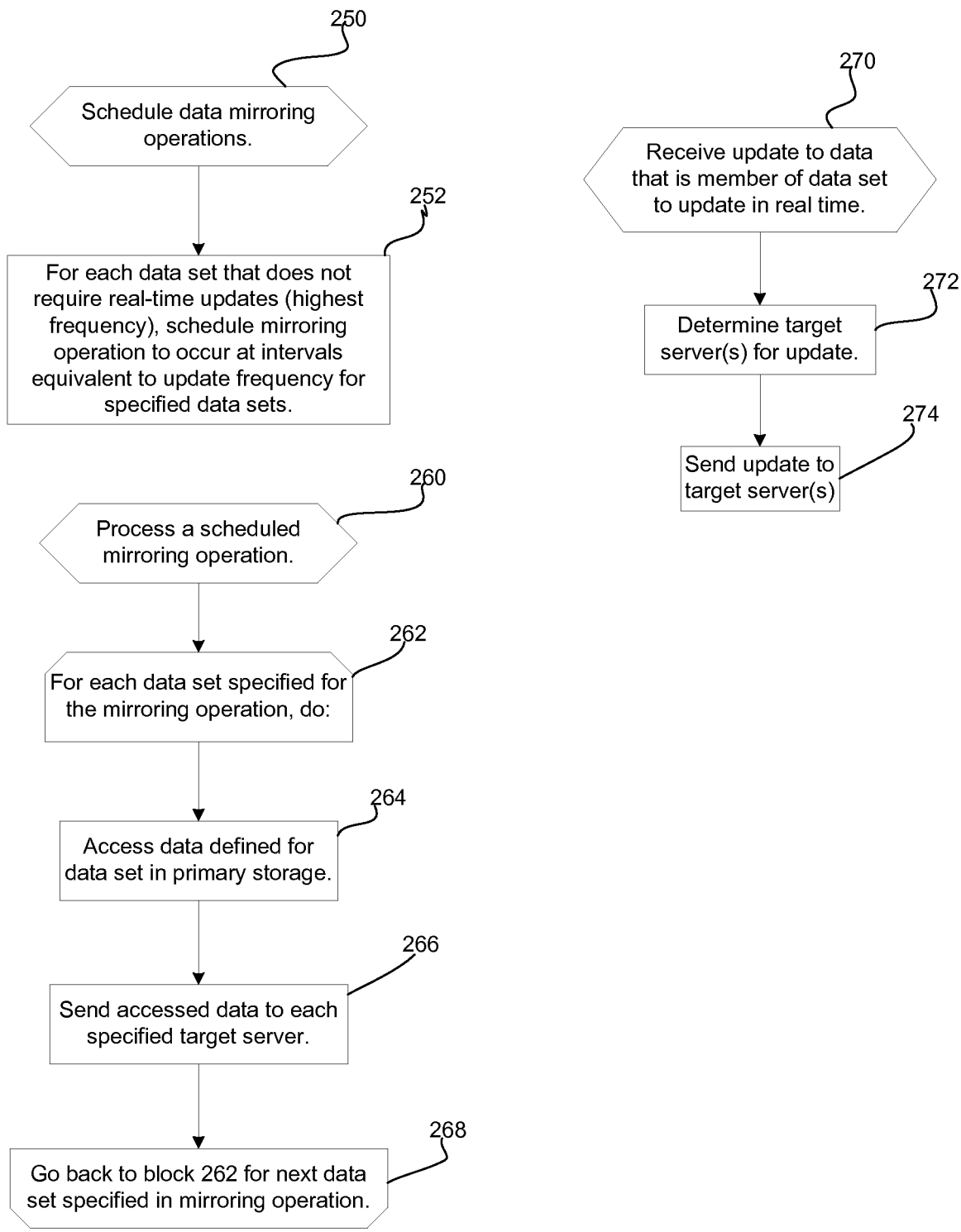

FIG. 4 illustrates logic implemented in the data copy program 24 at the primary server 2 to propagate updated data to the secondary servers 30a and 30b. At block 250, the data copy program 24 begins the process to schedule data mirroring operations. For each entry 200 (FIG. 3) in the data routing map 42 that does not require real-time updates, the data copy program 24 schedules (at block 252) a mirroring operation to occur at an interval equivalent to the specified update frequency 204 for the entry 200. The scheduled mirroring operation would indicate the data set entries 200 to include in the mirroring operation and the target secondary site(s). At block 260, the data copy program 24 processes a scheduled mirroring operation. A loop is performed at blocks 262 through 268 for each data set entry 200 specified for the scheduled mirroring operation. The data specified in the data set 202 for the entry 200, which may comprise database data 20, content 22 or data satisfying a query defined for the mirroring operation, is accessed (at bock 264) from primary storage 18 and sent (at block 266) to each secondary server 30a, 30b specified in the target server information 206.

At block 270, in response to receiving an update to data that is a member of a data set 202 specified in an entry 200 as having an high update frequency 204, such as "real-time", control proceeds to block 272 to determine the one or more secondary servers 30a and 30b specified in the target server information 206. The updates are then sent (at block 274) to the determined secondary server(s) to apply to the attached secondary storage 32a, 32b.

With the logic of FIG. 4, updated data to the primary storage 18 is propagated to the secondary storages according to an update frequency specified for the data. This allows updates to more critical data to be updated immediately at the secondary storage, whereas less critical data that does not change frequently may be updated with less frequency. Further, the data copy programs 34a and 34b at the secondary servers 30a and 30b, respectively, would send any updates to the data at the secondary storage 32a, 32b to the primary server 2. This allows the clients to update data at the secondary server to which they were redirected. In the logic of FIG. 4, the update frequency indicated a time interval at which to propagate non-critical data to the secondary servers 30a and 30b. In alternative implementations, the update frequency may comprise one or more threshold triggers other than a time interval. For instance, the update frequency may indicate a threshold percentage of non-critical data that has been modified, e.g., 10%, such that after modification of such threshold percentage of the non-critical data, the updated non-critical data is propagated to the secondary servers 30a and 30b. Still further, the update frequency criteria may also indicate a threshold count of the number of updates to non-critical data, such that upon reaching the threshold count value, the modified non-critical data is propagated to the secondary servers 30a and 30b. Alternative update frequency criteria may be applied in lieu of the time interval frequency described with respect to FIG. 4 or in addition to FIG. 4, such that the non-critical data is propagated to secondary sites upon the occurrence of one or more triggering events, e.g., expiration of a specified time interval, updating a threshold percentage of non-critical data, performing a threshold number of updates to non-critical data, etc. Different criteria may be maintained for different groups of the non-critical data, i.e., different data sets 202 indicated in different entries 200 (FIG. 3).

FIG. 5 illustrates logic implemented in the data copy program 24 to propagate non-critical data when the update frequency 204 indicates a time interval, threshold percentage of updated non-critical data, and/or a threshold absolute number of updates to non-critical data. In the logic of FIG. 5, each of these checks are described as being considered together. However, in additional implementations, only one of these checks may be performed to determine when to propagate non-critical data, or any combination of the different checks may be used. Control begins at block 280 after propagating updates to non-critical data to the target server(s) 206. In response, a timer is cleared (at block 282) that is used to determine when a time interval specified in the update frequency 204 (FIG. 3) has expired, an update percentage count is cleared (at block 284) indicating the percentage of non-critical data that has been updated, and an update count is cleared (at block 286) indicating the number of updates to non-critical data that have been performed. Upon the occurrence of any one of the above thresholds being satisfied at blocks 288, 290 or 292, the updated non-critical data is then propagated (at block 294) to the one or more target servers 30a and 30b indicated in the target server field 206.

FIG. 6 illustrates logic implemented in the primary 2 and secondary 30a, 30b servers to handle data requests from clients. Control begins at block 300 with the primary HTTP server 4 receiving a request for data from a client 6a, 6b . . . 6n, 10a, 10b . . . 10n and determining (at block 302) a redirect secondary server 30a, 30b, and redirecting the requesting client to that redirect secondary server. The HTTP server 4 may use any criteria known in the art for selecting a secondary server 30a, 30b as the redirect server. In certain implementations, the HTTP server 4 may select the secondary server 30a, 30b that is within the defined location of the client, e.g., client 6a, 6bn . . . 6n requests are redirected to secondary server 30a. Additionally, the HTTP server 4 may perform load balancing to redirect the request to the secondary server with the lowest current load, thereby minimizing server load delays. Still further, the HTTP server 4 may apply a combination of factors, or any other redirection selection factors known in the art.

At block 310 in FIG. 6, one secondary server 30a, 30b receives the redirected client request. FIG. 1 shows how client requests 50a and 50b are redirected at path 52a and 52b to one secondary server 30a and 30b, respectively. After redirection, the client may communicate directly with the secondary server 30a and 30b, as shown on paths 54a and 54b. If (at block 312) the requested data is not within the secondary storage 32a, 32b, then the secondary server 30a, 30b requests (at block 314) the requested data from the primary server 2 and stores the returned data in the secondary storage 32a, 32b. From block 314 or the yes branch of block 312, the requested data is returned (at block 316) to the client initiating the request.

FIG. 7 illustrates logic implemented in the transaction code 37a and 37b in the secondary servers 30a, 30b to process a redirected transaction request from a client 6a, 6n . . . 6n, 10a, 10b . . . 10n. Control begins at block 320 upon the HTTP server 36a, 36b in one secondary server 30a, 30b receiving a redirected transaction request from the client, such as a request to purchase or procure goods or services. If (at block 322) the location database data 38a, 38b indicates that the requesting client is not registered, then the transaction code 37a, 37b transmits (at block 324) a registration page to the client 6a, 6b . . . 6n, 10a, 10b . . . 10n requesting the client to register. Upon receiving the returned client registration information, the transaction code 37a, 37b updates (at block 326) the location database data 38a, 38b with the new client registration information and then sends the new client registration information to the primary server 2. The primary server 2 would then propagate the received client registration information to the other secondary servers so all remote sites maintain consistent information. The location database data 38a, 38b may include different database tables, such as a customer registration table including information on a registered customer, such as address, billing, and credit card information, tables including information on product pricing and inventory. As discussed, the information in the location database data 38a, 38b may be specific to the location, such as all customers within the defined location.

If (at block 322) the requesting client is registered, then the transaction code 37a, 37b generates (at block 328) a transaction object and assigns a unique identifier (ID) to the transaction. The transaction object may comprise a record in a database table providing information on a client transaction prior to finalization or some data structure maintaining information on a client initiated transaction. Additionally, in workflow processing environments, such as the IBM MQSeries** workflow environment, the transaction may comprise a piece of workflow that is processed at different nodes in a workflow management scheme. At block 330, the transaction code 37a, 37b receives selection of items for the transaction from the client, e.g., selected goods and services. If (at block 332) the location database data 38a, 38b indicates that the selected items are not available, i.e., not in current inventory or unable to be provided, then the transaction code 37a, 37b returns (at block 334) a message to the requesting client that the requested items are unavailable. At this time, the requesting client may be provided the option to backorder the items. If (at block 332) the requested items are available, then indication of the items are added (at block 336) to the transaction, i.e., transaction object or database record.

The transaction code 37a, 37b then accesses (at block 338) client customer information and accesses (at block 340) pricing information for the selected product from the location database data 38a, 38b or content 40a, 40b and then generates (at block 342) a transaction approval page for the client including the unique transaction ID, customer information, selected transaction items, cost of selected items, and a request for selection of a payment method. The transaction approval page is returned to the client 6a, 6b . . . 6n, 10a, 10b . . . 10n. In alternative implementations, different types of information may be included in the pages transmitted to the application to accomplish the transaction.

FIG. 8 illustrates logic implemented in the secondary and primary server transaction code 5, 37a, 37b to process a client approval of a transaction. Control begins at block 350 with the secondary server transaction code 37a, 37b receiving acceptance from a transaction approval form sent to a requesting client. The transaction code 37a, 37b then begins (at block 352) a process to approve the transaction by verifying data from the location database data 38a, 38b and obtain approval from the credit card issuer for the transaction. As mentioned, the processing may be implemented by a workflow model. If (at block 354) the transaction is not approved, then a disapproved message is returned to the client, perhaps stating the reason for the disapproval, e.g., failure of credit card authorization. If the transaction is approved, then the secondary server transaction code 37a, 37b sends (at block 358) the transaction information to the primary server 2 to finally approve of the transaction.

At block 360, the primary server transaction code 5 receives the request to approve the transaction and transaction information from the secondary server 30a, 30b. In response, the primary server transaction code 5 processes (at block 362)

the primary database data 20 to verify the availability of the items included in the transaction and the customer information. In certain implementations, the payment or credit card approval may be performed at the primary server and not the secondary server as shown in FIG. 8. If (at block 364) all transaction information is consistent with the information maintained in the primary database data 20, then the primary server transaction code 5 initiates (at block 366) a process to carry out the transaction, such as starting a workflow to execute the transaction, gather the transacted items, ship the items, and bill the customer's credit card. The primary server transaction code 5 returns (at block 368) approval to the secondary server 30*a*, 30*b* submitting the approval request. In response to the received approval, the secondary server transaction code 37*a*, 37*b* returns (at block 380) a page or message to the requesting client that the transaction was approved.

If (at block 364) the primary server transaction code 5 determined that some of the received transaction information is not consistent with the data in the primary storage 18, then the transaction code 5 would generate and transmit (at block 380) a message to the secondary server 30*a*, 30*b* that the data was not verified and include the data from the primary site that is inconsistent with the data gathered from the secondary storage 32*a*, 32*b*. In response to receiving the message, the secondary server transaction code 37*a*, 37*b* would update (at block 382) the location database data 38*a*, 38*b* and/or content 40*a*, 40*b* with the data received from the primary server 2. The transaction code 37*a*, 37*b* would then generate and transmit (at block 384) a revised transaction approval page to the client 6*a*, 6*b* . . . 6*n*, 10*a*, 10*b* . . . 10*n* including previous transaction data updated with new information from the primary storage 18 that was inconsistent with the data previously included in the transaction, for instance any price change information or customer billing or contact information, product information, etc. Control would then return to block 350 to await the client's acceptance of the revised transaction.

With the described implementations, most of the parts of a transaction and most data verification and gathering occurs at a remote secondary server from data mirrored for that location in the secondary storage. The architecture improves response times to client requests by reducing the transmission distance of the requests because the client is redirected to communicate with a more geographically proximate server and by redistributing the load from the primary server to remote secondary servers. Moreover, in certain implementations, data is propagated to the secondary servers in a manner that provides the secondary sites with data in a timely manner and conserves network bandwidth. This is accomplished by propagating updates to critical data, such as customer information, payment information, inventory information, etc., at a high frequency, such as real time, and propagating updates to data that changes less frequently at greater intervals.

Still further, with the described implementations, data and transaction consistency is maintained because final approval of the transaction is obtained from a primary storage site, which includes the most recent version of data and ensures that a transaction processed at a secondary site is not based on stale or inconsistent data.

Additional Implementation Details

The described data mirroring and transaction techniques may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The messages and information returned to the clients in response to transaction related requests may comprise pages, such as HTML or XML pages transmitted using the HTTP protocol or comprise e-mail messages or instant messaging messages.

In the described implementations one instance of a primary server and primary storage is shown. In further implementations, the primary site may comprise multiple primary servers and primary storages. In certain implementations, two secondary storage sites are shown each including one secondary server and secondary storage. In further implementations, there may be more than two secondary storage sites at different geographical locations and each site may include multiple secondary servers and/or secondary storages.

The preferred logic of FIGS. 4-8 described specific operations occurring in a particular order. Further, the steps may be performed in parallel as well as sequentially. In alternative embodiments, certain of the logic operations may be performed in a different order, modified or removed and still implement preferred embodiments of the present invention. Moreover, steps may be added to the above described logic and still conform to the preferred embodiments. Yet further, steps may be performed by a single processing unit or by distributed processing units.

In the described implementations, the transaction initiated by the client comprised a transaction to purchase goods or services from a commercial retailer e-commerce web site. In alternative implementations, the transactions processed in the manner described above may comprise any type of transaction requesting resources or interactions that a client would transmit across a network. Thus, the described implementations are not limited to commercial e-commerce type operations and may encompass any network transaction known in the art that is serviced from a server.

In certain implementations, the distributed systems communicated across the networks using the HTTP protocol for transmitting documents between computers within a network. However, those skilled in the art will appreciate that any communication protocol may be used to transmit information in accordance with implementations of the invention.

In certain implementations, the secondary servers transmitted pages of data to the clients in the HTML or XML file format. However, any document or data format known in the art may be used to transmit information between the systems.

The foregoing description of the described implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A distributed computing system for maintaining data, comprising:
    a primary storage site;
    a plurality of secondary storage sites;
    a copy program executed at the primary storage site to perform operations, the operations comprising:
        storing data at the primary storage site;
        processing a data structure indicating associations of data sets in the stored data, the plurality of secondary storage sites, and update frequencies;
        in response to processing the data structure, determining secondary storage sites and determining at least one data set indicated in the data structure to transmit to each determined secondary storage site at a determined update frequency associated with the determined at least one data set to transmit and the determined secondary storage site, wherein the determined update frequency indicates a number of modifications threshold indicating a number of modifications made to the determined at least one data set; and
        transmitting the determined at least one data set to each of the determined secondary storage sites after the number of modifications to the data set reaches the threshold number of modifications threshold indicated in the determined update frequency, wherein the determined secondary storage sites are at different geographical locations, and wherein the transmitted at least one data set to the determined secondary storage sites include different location specific data for the different geographical locations of the secondary storage sites, wherein the different location specific data includes different customer information for customers within the geographical locations of the determined secondary storage sites, and wherein the different location specific data for the different geographical locations of the determined secondary storage sites comprises subsets of the customer information stored at the primary site.

2. The system of claim 1, wherein the data structure includes entries, wherein each entry indicates at least one data set to be transmitted to at least one secondary site at one update frequency.

3. The system of claim 2, wherein different data sets are transmitted from the primary storage site to different secondary storage sites at different update frequencies.

4. The system of claim 1, wherein one update frequency comprises a high frequency update setting, wherein transmitting the determined at least one data set to the determined secondary storage sites associated with the high frequency update setting comprises transmitting one update to the determined at least one data set to the determined secondary storage sites when the update is applied to the primary storage site.

5. The system of claim 1, wherein the update frequency indicates:
    a time interval during which data is transmitted to the secondary storage sites, wherein the data set indicated in the data structure is transmitted to a secondary storage site after expiration of the time interval indicated in the data structure.

6. The system of claim 1, wherein customers at a location of a secondary storage site access the secondary storage site to perform transactions.

7. An article of manufacture including code executed by at least one processor for maintaining data in a distributed computing environment, wherein the executed code causes operations comprising:
    storing data at a primary storage site;
    processing a data structure indicating associations of data sets in the stored data, secondary storage sites, and update frequencies;
    in response to processing the data structure, determining secondary storage sites and determining at least one data set indicated in the data structure to transmit to each determined secondary storage site at a determined update frequency associated with the determined at least one data set to transmit and the determined secondary storage site, wherein the determined update frequency indicates a number of modifications threshold indicating a number of modifications made to the determined at least one data set; and
    transmitting the determined at least one data set to each of the determined secondary storage sites after the number of modifications to the data set reaches the threshold number of modifications threshold indicated in the determined update frequency, wherein the determined secondary storage sites are at different geographical locations, and wherein the transmitted at least one data set to the determined secondary storage sites include different location specific data for the different geographical locations of the secondary storage sites, wherein the different location specific data includes different customer information for customers within the geographical locations of the determined secondary storage sites, and wherein the different location specific data for the different geographical locations of the determined secondary storage sites comprises subsets of the customer information stored at the primary site.

8. The article of manufacture of claim 7, wherein the data structure includes entries, wherein each entry indicates at least one data set to be transmitted to at least one secondary site at one update frequency.

9. The article of manufacture of claim 8, wherein different data sets are transmitted from the primary storage site to different secondary storage sites at different update frequencies.

10. The article of manufacture of claim 7, wherein one update frequency comprises a high frequency update setting, wherein transmitting the determined at least one data set to the determined secondary storage sites associated with the high frequency update setting comprises transmitting one update to the determined at least one data set to the determined secondary storage sites when the update is applied to the primary storage site.

11. The article of manufacture of claim 7, wherein the update frequency indicates:
   a time interval during which data is transmitted to the secondary storage sites, wherein the data set indicated in the data structure is transmitted to a secondary storage site after expiration of the time interval indicated in the data structure.

12. The article of manufacture of claim 7, wherein customers at a location of a secondary storage site access the secondary storage site to perform transaction.

* * * * *